Patented Oct. 30, 1928.

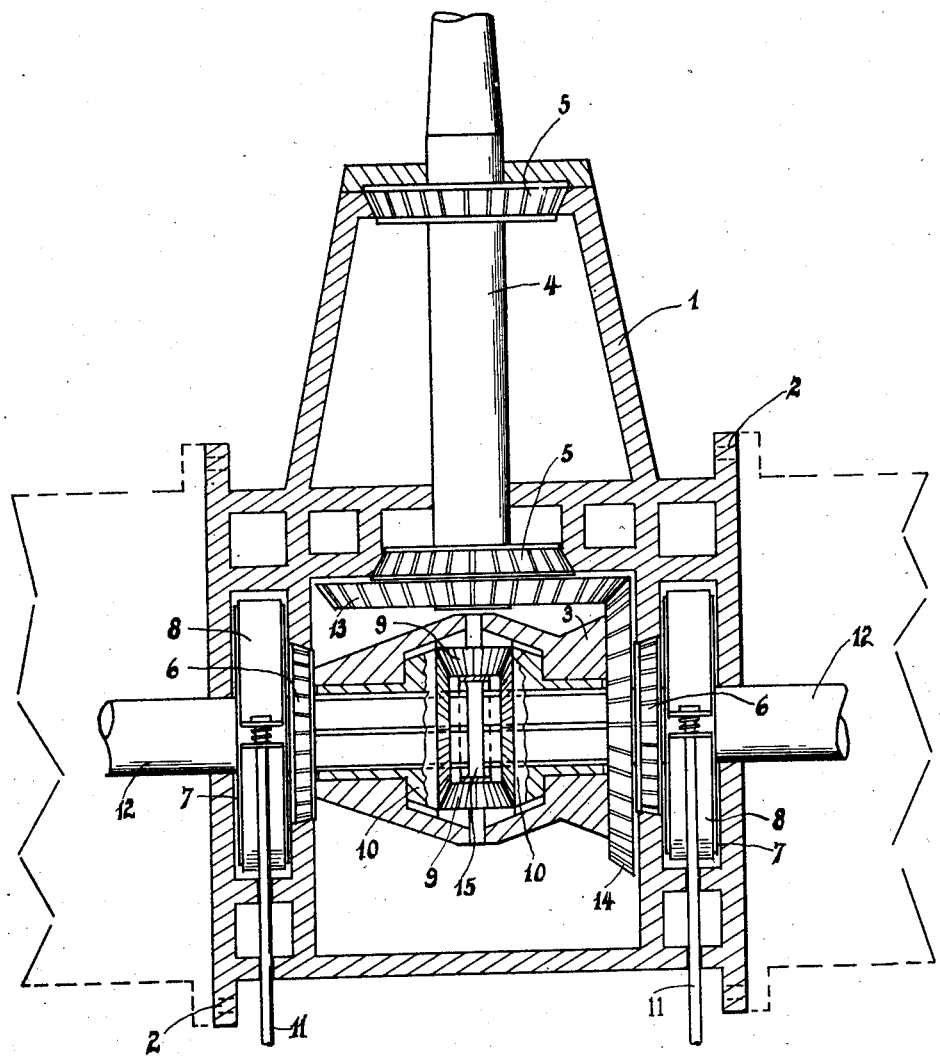

1,689,751

UNITED STATES PATENT OFFICE.

LYNN H. RENGLER, OF LONG BEACH, CALIFORNIA.

DRIVE UNIT FOR TANDEM AIRCRAFT ENGINES.

Application filed October 12, 1926. Serial No. 141,063.

The present invention relates to improvements in a tandem engine compensating aircraft propeller drive unit in which compensating or differential gears, mechanical brakes, propeller drive shafts and propeller drive shaft gears and bearings are incorporated in an oil tight gear case or housing which serves as a mounting for the two engines, the crank cases of the engines being bolted directly to the gear casing or housing; and the objects of the improvement are:

First; to provide equalization of the power and compensation for the variation in engine crank shaft speed, of two engines driving the same propeller shaft;

Second; to afford facilities for holding stationary the crank shaft of either engine while the opposite engine crank shaft continues to revolve, driving the propeller shaft at a reduced gear ratio through the medium of compensating or differential gears;

Third; to provide a unit mounting for the two engines, propeller shaft and propeller and an oil reservoir for lubricating the gears and bearings therein;

Fourth; to provide for variations in propeller gear ratio in relation to engine crank shaft speed by substituting propeller shaft driving gear and differential ring or driving gear of different demensions and number of teeth for the regular gears; and, Fifth; to provide a tandem engine unit in which there is no side draft when operating with one engine as the power is aways applied to center, and one propeller is used.

Among other aims and objects of this invention may be cited the provision of a device of the character described with a view to compactness and in which the number of parts are few, the construction simple and the cost of production relatively low.

With these and numerous other objects in view, the invention resides in the construction, combination and arrangement of parts as will be hereinafter fully described, illustrated in the accompanying drawing, and pointed out in the claims hereunto appended.

One form of the invention is illustrated in the accompanying drawing, in which the figure is a horizontal section of the entire machine.

The oil tight gear casing or housing 1 is to accommodate all gears, shafts, bearings, and controls and to carry the two engines which are bolted to the flanges 2, 2; their crank shafts 12, 12 extending into the differential side gears 10 are splined at the ends and the hole through the center portion of the differential side gears 10 is machined to receive the splined ends of engine crank shafts 12, 12. The brake drums 7, 7 are secured to the engine crank shaft 12, 12. The brake bands 8, 8 are carried by the gear casing or housing 1 and are operated by control rods 11. The differential cage or carrier 3 is carried on the annular and thrust bearings 6, 6, and the spider gears or pinions 9 are attached to the differential cage or carrier 3 by means of the spider 15 and revolve with the same, while the differential side gears 10 are attached to the crank shaft 12, 12 and revolve with the same. The propeller drive shaft gear 13 is secured to the propeller drive shaft 4 and engages with the differential ring or driving gear 14. The propeller drive shaft 4 is carried in the annular and thrust bearings 5, 5 and the forward end of the propeller drive shaft 4 is tapered and machined to receive a standard hub.

To start the engines, the brake 7 on either engine is applied through the control rod 11 thus preventing the crank shaft of this engine from revolving, the propeller is turned and the opposite engine is started in the usual manner. With this engine operating, to start the opposite engine, the engine operating is accelerated and suddenly throttled down and the brake on the dead engine is simultaneously released allowing the momentum of the propeller to crank or start said engine. With both engines operating, the operator manipulates the controls in such a manner that both engines are revolving at approximately the same speed and sets the controls accordingly. The compensating or differential gears compensate for any variation in revolutions per minute of the two engines and also apply their power to the propeller drive shaft equally regardless of a variation of the speed of the two engines. In the event one of the engines becomes inoperative, the brake 7 is applied on the crank shaft of said inoperative engine preventing the same from revolving backward (as it would have a tendency to do) and the opposite engine continues to drive the propeller at a reduced gear ratio or at one-half engine crank shaft speed (granting a ratio between the gears 13 and 14 as 1 to 1). The speed of this engine is now increased or doubled and the ship is able to maintain its cruising speed or approximately so. For example: with a one to one propeller shaft drive ratio and both engines rotating at twelve hundred revolutions per minute (the propeller is also rotating at twelve hundred revolutions per minute) the ship is cruising at one hundred miles per hour. Now, if one engine is stopped and the brake applied to the crank shaft, the other engine still rotating at twelve hundred revolutions per minute, the propeller speed is decreased to six hundred revolutions per minute but the engine may be accelerated to twenty-four hundred revolutions per minute and the propeller is again rotating at twelve hundred revolutions per minute and the ship regains its cruising speed of one hundred miles per hour with one engine operating and the other stopped. Either engine may be quickly removed by disconnecting the controls and feed lines and removing nuts from crank case studs and another engine equally as easily installed. This unit is particularly and peculiarly adapted to the modern aircraft engine, the radial air-cooled engine which may be used with this unit with a few changes, such as machining the crank shaft to fit the differential side gears 10 and the crank case cover shaped and machined to attach to the gear case 1 and as understood the two crank shafts must revolve in the same direction, thus the crank shaft of one engine may be extended from its front and the other from the rear of the crank case and the front of the former crank bolted to gear case 1 and the rear of the latter crank case bolted to the gear case 1. Or both engines may be bolted in front of the crank case to the gear case 1, or back of the crank case to gear case 1 by adjusting the engines in such a manner that one operates clockwise and the other counter-clockwise.

From the foregong, it is readily apparent that I have provided an efficient and substantial device of the character described and while this specification manifests the details and preferred construction of the invention, I do not wish to be understood as limiting myself to the specific details of construction and arrangements of parts as herein described and illustrated, as it is manifest that variations and modifications may be resorted to in the features of construction and arrangement of parts and the adaptation of the device to various conditions of use without departing from the spirit and scope of the invention. I therefore reserve the right to all such variations and modifications as properly fall within the scope of my invention as hereinafter claimed.

From the foregoing, it is thought that the construction of my invention will be clearly understood, and, therefore, a more extended explanation has been omitted.

Having thus described my invention what I claim as new is:—

1. A drive unit for tandem aircraft engines comprising a housing to which the engines are adapted to be secured, shafts on said engines, a propeller shaft, differential gear means connecting said first named shafts and the propeller shaft, and brake means on said first named shafts.

2. In a drive unit for tandem aircraft engines comprising a housing to which the engines are adapted to be bolted, a shaft on each of said engines, said shafts being substantially in alinement, a propeller shaft, differential gear means connecting said first named shafts and the propeller shaft, and brake means on each of said first named shafts.

3. A drive unit for tandem aircraft engines comprising a housing to which the engines are adapted to be secured, shafts on said engines extending into the housing, a propeller shaft extending from the housing, differential side gears mounted on said engine shafts, spider gears meshing with the differential side gears, a differential cage carrying said spider gears and gear means connecting said cage and propeller shaft, and brake means on both of said first named shafts.

In testimony whereof I affix my signature.

LYNN H. RENGLER.